United States Patent
Kim et al.

(10) Patent No.: US 8,184,222 B2
(45) Date of Patent: May 22, 2012

(54) DISPLAY APPARATUS AND METHOD THEREOF

(75) Inventors: Dong-Gyu Kim, Yongin-si (KR); Ho-Kyoon Kwon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 365 days.

(21) Appl. No.: 12/470,719

(22) Filed: May 22, 2009

(65) Prior Publication Data
US 2009/0296010 A1   Dec. 3, 2009

(30) Foreign Application Priority Data
May 27, 2008   (KR) .................. 10-2008-0049224

(51) Int. Cl.
  *G02F 1/1343* (2006.01)
(52) U.S. Cl. ............................. 349/39; 349/38
(58) Field of Classification Search ............ None
  See application file for complete search history.

(56) References Cited

U.S. PATENT DOCUMENTS

| | | | |
|---|---|---|---|
| 5,943,106 A * | 8/1999 | Sukenori et al. ........... | 349/39 |
| 6,040,882 A * | 3/2000 | Jun et al. ................... | 349/39 |
| 6,724,443 B1 | 4/2004 | Sano et al. | |
| 7,304,691 B2 * | 12/2007 | Song et al. ................. | 349/39 |
| 7,372,528 B2 * | 5/2008 | Jeon et al. ................. | 349/110 |
| 7,414,697 B1 * | 8/2008 | Choi et al. ................. | 349/192 |
| 7,535,520 B2 * | 5/2009 | Yoon et al. ................. | 349/43 |
| 7,554,630 B2 * | 6/2009 | Kwon et al. ............... | 349/111 |
| 2003/0137622 A1 * | 7/2003 | Song ........................ | 349/110 |
| 2008/0204613 A1 * | 8/2008 | Kim et al. .................. | 349/33 |

FOREIGN PATENT DOCUMENTS

| KR | 10-0193653 B1 | 2/1999 |
|---|---|---|
| KR | 10-0250093 B1 | 12/1999 |

* cited by examiner

*Primary Examiner* — Mike Stahl
(74) *Attorney, Agent, or Firm* — Cantor Colburn LLP

(57) ABSTRACT

A display apparatus includes a storage line, a main-storage electrode branched from the storage line, and sub-storage electrodes branched from the main-storage electrode. The main-storage electrode and the sub-storage electrodes form storage capacitors with a pixel electrode. The main-storage electrode has a structure that is suitable for improving an aperture ratio of the display apparatus, and the sub-storage electrodes has a structure that is suitable for improving a driving capability of the display apparatus. Thus, a desired aperture ratio and a desired driving capability may be obtained by adjusting lengths of the main-storage electrode and the sub-storage electrodes.

23 Claims, 5 Drawing Sheets

DISPLAY APPARATUS AND METHOD THEREOF

This application claims priority to Korean Patent Application No. 2008-49224, filed on May 27, 2008, and all the benefits accruing therefrom under 35 U.S.C. §119, the contents of which in its entirety are herein incorporated by reference.

BACKGROUND OF THE INVENTION

1. Field of the Invention

The present invention relates to a display apparatus and a method thereof. More particularly, the present invention relates to a display apparatus capable of improving a display quality and a driving capability, and a method of improving a display quality and a driving capability of a display apparatus.

2. Description of the Related Art

A display apparatus displays images corresponding to external input signals in a pixel area defined thereon. In general, the display apparatus includes a first substrate and a second substrate facing the first substrate. In the case of a liquid crystal display ("LCD"), the LCD further includes a liquid crystal layer interposed between the first substrate and the second substrate.

Electrodes are formed on each of the first and second substrates, and an electric field generated by the electrodes controls an alignment of liquid crystal molecules in the liquid crystal layer of the LCD. As a result, light transmittance is adjusted according to the alignment of the liquid crystal molecules to display desired images on the LCD.

Meanwhile, the electrodes and the liquid crystal layer disposed between the electrodes form a liquid crystal capacitor. The liquid crystal capacitor is charged with electric charges that are required to maintain the electric field generated between the two electrodes during one frame.

Also, the LCD further includes a storage capacitor supplying electric charges corresponding to electric charges that are discharged from the liquid crystal capacitor, and the storage capacitor is formed by a storage electrode that overlaps one of the two electrodes formed on the first and second substrates.

BRIEF SUMMARY OF THE INVENTION

It has been determined herein, according to the present invention, that since the storage electrode of a liquid crystal display ("LCD") includes a metal material, the storage electrode blocks a light passing through the LCD. That is, an aperture ratio of the LCD decreases due to the storage electrode that overlaps one of the two electrodes. In addition, it has been further determined herein, that in a case where the storage electrode overlaps wires formed on either the first substrate or the second substrate, the storage electrode forms a parasitic capacitor together with the wires, thereby causing a delay of an electric signal transmitted through the wires.

The present invention provides a display apparatus having improved display quality and driving capability.

The present also provides a method of improving display quality and driving capability of a display apparatus.

In exemplary embodiments of the present invention, a display apparatus includes a first substrate, a second substrate facing the first substrate, a gate line arranged on the first substrate, a data line arranged on the first substrate, the data line crossing the gate line, and a storage line arranged on the first substrate and spaced apart from the gate line.

Also, the display apparatus includes a pixel electrode arranged in a pixel area, a common electrode arranged on the second substrate to face the pixel electrode, a main-storage electrode branched from the storage line to overlap with the pixel electrode and to partially overlap with the data line, and sub-storage electrodes branched from the main storage electrode to overlap with the pixel electrode.

In other exemplary embodiments of the present invention, a display apparatus includes a first substrate, a second substrate facing the first substrate, a gate line arranged on the first substrate, and a data line arranged on the first substrate and crossing the gate line.

Also, the display apparatus includes a light blocking layer arranged on the first substrate and provided with an opening formed therethrough corresponding to a pixel area, a storage line arranged on the first substrate and spaced apart from the gate line, a pixel electrode arranged in the pixel area, a common electrode arranged on the second substrate to face the pixel electrode, a storage electrode branched from the storage line to overlap with the pixel electrode and to partially overlap with the data line, and a plurality of floating-storage electrodes spaced apart from the storage electrode to overlap with the pixel electrode.

In still other exemplary embodiments of the present invention, a method of improving a display quality and a driving capability of a display apparatus includes arranging a storage line on a first substrate, the storage line extending in a first direction, depending a main storage electrode from the storage line to overlap with a pixel electrode and a data line, the main storage electrode extending in a second direction crossing the first direction, the main storage electrode having a first length, providing first and second sub-storage electrodes adjacent to an end of the main storage electrode and extending in the second direction to overlap with the pixel electrode, the first and second sub-storage electrodes arranged on opposite sides of the data line and spaced from the data line to minimize parasitic capacitance, the first and second sub-storage electrodes having a second length, wherein the display quality of the display apparatus is improved by controlling the first length of the main storage electrode to maximize an aperture ratio of the display apparatus, and the driving capability of the display apparatus is improved by controlling the second length of the first and second sub-storage electrodes to reduce delay of data signals transmitted through the data line.

According to the above, a capacitance of the storage capacitor and an aperture ratio of the display apparatus may be adjusted according to a structure of the storage electrode of the display apparatus. Also, a capacitance of a parasitic capacitor that causes the delay of electric signals transmitted through wires may decrease.

BRIEF DESCRIPTION OF THE DRAWINGS

The above and other features and advantages of the present invention will become readily apparent by reference to the following detailed description when considered in conjunction with the accompanying drawings wherein.

DETAILED DESCRIPTION OF THE INVENTION

Figure 1:
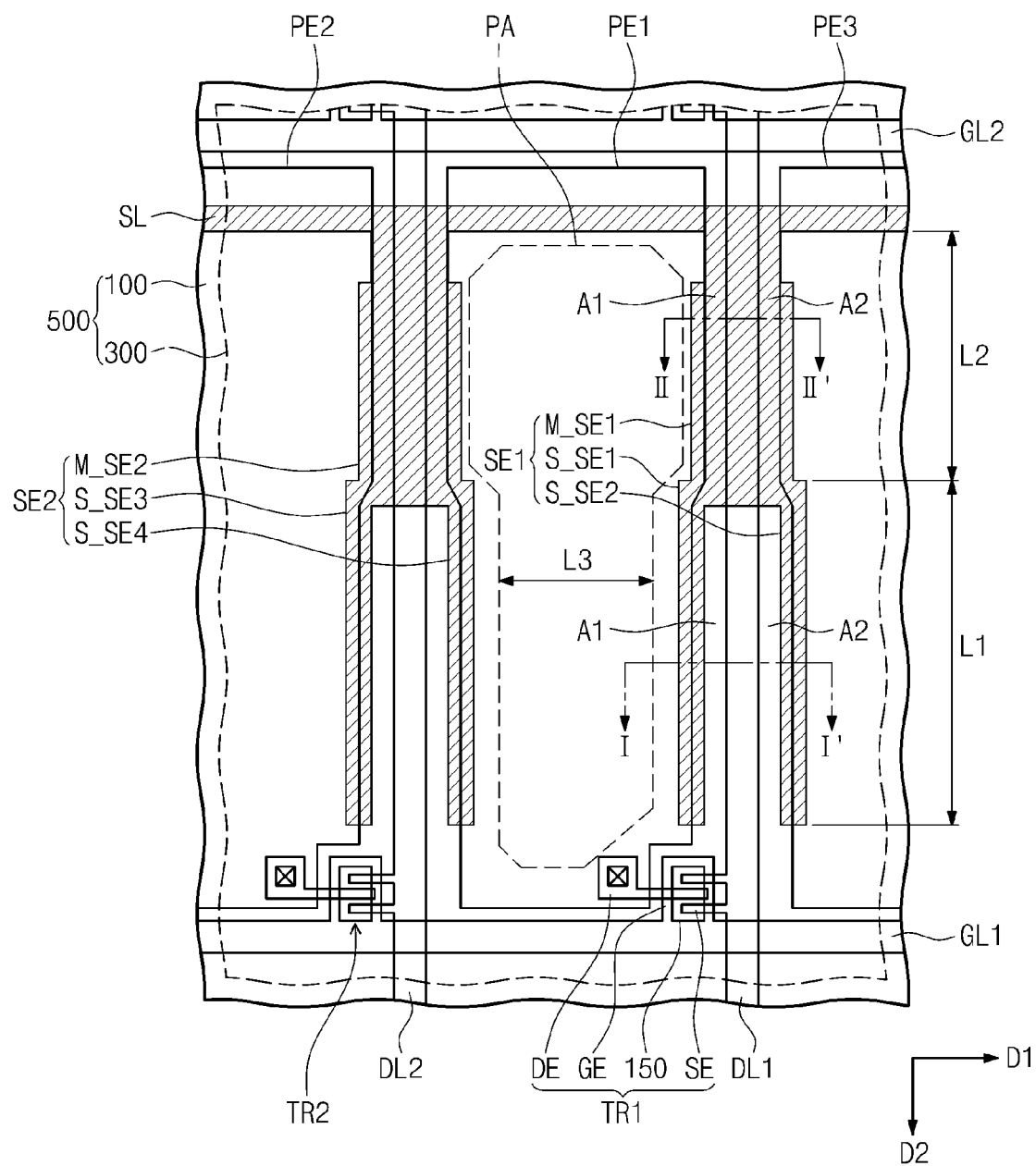
FIG. 1 is a plan view showing an exemplary embodiment of a liquid crystal display ("LCD") according to the present invention.

Hereinafter, exemplary embodiments of the present invention will be described in detail with reference to accompanying drawings. However, the present invention is not limited to the following embodiments but includes various applications and modifications. The following embodiments are provided to clarify the technical spirit disclosed in the present invention and to sufficiently transmit the technical spirit of the present invention to the one having mean knowledge and skill in this field. Therefore, the scope of the present invention should not be limited to the following embodiments. In addition, the size of the layers and regions of the attached drawings along with the following embodiments are simplified or exaggerated for precise explanation or emphasis and the same reference numeral represents the same component.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Hereinafter, the present invention will be explained in detail with reference to the accompanying drawings.

FIG. 1 is a plan view showing an exemplary embodiment of a liquid crystal display ("LCD") according to the present invention. In FIG. 1, a structure of a first substrate 100 for the LCD 500 will be described in detail. More particularly, a pixel area PA, a first data line DL1 and a first gate line GL1 crossing the first data line DL1, and a pixel that is formed on the first substrate 100 corresponding to the pixel area PA are shown in FIG. 1. Meanwhile, a plurality of pixel areas is defined on the first substrate 100, and a plurality of pixels is formed in the pixel areas in one-to-one correspondence relationship. In the present exemplary embodiment, since the pixels have the same structure, only one pixel will be described in detail and thus the detailed description of the other pixels will be omitted.

Referring to FIG. 1, an LCD 500 includes the first substrate 100, a second substrate 300, and a liquid crystal layer 200 (shown in FIG. 2) interposed between the first substrate 100 and the second substrate 300.

A first gate line GL1, a second gate line GL2, a first data line DL1, a second data line DL2, a storage line SL, a first storage electrode SE1, a second storage electrode SE2, a first pixel electrode PE1, a second pixel electrode PE2, a third pixel electrode PE3, a first thin film transistor TR1, and a second thin film transistor TR2 are formed on the first substrate 100.

The first gate line GL1 and the second gate line GL2 extend in a first direction D1, and the first data line DL1 and the second data line DL2 extend in a second direction D2 that is substantially perpendicular to the first direction D1. The first and second gate lines GL1 and GL2 cross the first and second data lines DL1 and DL2. In an exemplary embodiment, the pixel area PA may be defined by the first and second gate lines GL1 and GL2 and the first and second data lines DL1 and DL2. The first pixel electrode PE1 is formed in the pixel area PA, and the first pixel electrode PE1 is electrically connected to the first thin film transistor TR1.

The first thin film transistor TR1 includes a gate electrode GE branched from the first gate line GL1, an active pattern 150 formed on the gate electrode GE, a source electrode SE branched from the data line DL and overlapped with the active pattern 150, and a drain electrode DE spaced apart from the source electrode SE and overlapped with the active pattern 150.

The first pixel electrode PE1 and the third pixel electrode PE3 are spaced apart from each other while interposing the first data line DL1 therebetween, and the first pixel electrode PE1 and the second pixel electrode PE2 are spaced apart from each other while interposing the second data line DL2 therebetween. The first to third pixel electrodes PE1, PE2, and PE3 are electrically connected to the first thin film transistor (TR1), the second thin film transistor (TR2), and a third thin film transistor (not shown) in a one-to-one correspondence relationship. Particularly, the first pixel electrode PE1 is electrically connected to the first thin film transistor TR1 through the drain electrode DE of the first thin film transistor TR1, and the second pixel electrode PE2 is electrically connected to the second thin film transistor TR2 through a drain electrode of the second thin film transistor TR2.

The storage line SL extends in the first direction D1. Also, the storage line SL is arranged adjacent to the second gate line GL2 but spaced apart from the second gate line GL2. The storage line SL extends between the first gate line GL1 and the second gate line GL2.

The first storage electrode SE1 includes a first main-storage electrode M_SE1, a first sub-storage electrode S_SE1, and a second sub-storage electrode S_SE2. The first main-storage electrode M_SE1 is branched from the storage line SL and extends in the second direction D2. Also, each of the first and second sub-storage electrodes S_SE1 and S_SE2 is branched from the first main-storage electrode M_SE1 and extends in the second direction D2. The first and second sub-storage electrodes S_SE1 and S_SE2 are spaced from each other.

Each of the first and second sub-storage electrodes S_SE1 and S_SE2 has a first length L1, and the first main-storage electrode M_SE1 has a second length L2. Also, the first storage electrode SE1 has a length that is equal to a sum of the first length L1 and the second length L2.

The second storage electrode SE2 includes a second main-storage electrode M_SE2, a third sub-storage electrode S_SE3, and a fourth sub-storage electrode S_SE4. The second main-storage electrode M_SE2 is branched from the storage line SL and extends in the second direction D2. Also, each of the third and fourth sub-storage electrodes S_SE3 and S_SE4 is branched from the second main-storage electrode M_SE2 and extends in the second direction D2. The third and fourth sub-storage electrodes S_SE3 and S_SE4 are spaced from each other.

The first storage electrode SE1 is overlapped by both the first pixel electrode PE1 and the third pixel electrode PE3 to form a storage capacitor, and the second storage electrode SE2 is overlapped by both the first pixel electrode PE1 and the second pixel electrode PE2 to form a storage capacitor.

More particularly, the first main-storage electrode M_SE1 is overlapped by both the first pixel electrode PE1 and the third pixel electrode PE3 that are spaced apart from each other while interposing the first data line DL1 therebetween. Therefore, the first main-storage electrode M_SE1 forms a storage capacitor with the first pixel electrode PE1, and the first main-storage electrode M_SE1 also forms a storage capacitor with the third pixel electrode PE3.

Meanwhile, the first main-storage electrode M_SE1, which depends from the storage line SL and which is overlapped by both the first pixel electrode PE1 and the third pixel electrode PE3, may overlap the first data line DL1 and form a parasitic capacitor with the first data line DL1. The parasitic capacitor may delay a data signal that is transmitted through the first data line DL1.

Figure 2:
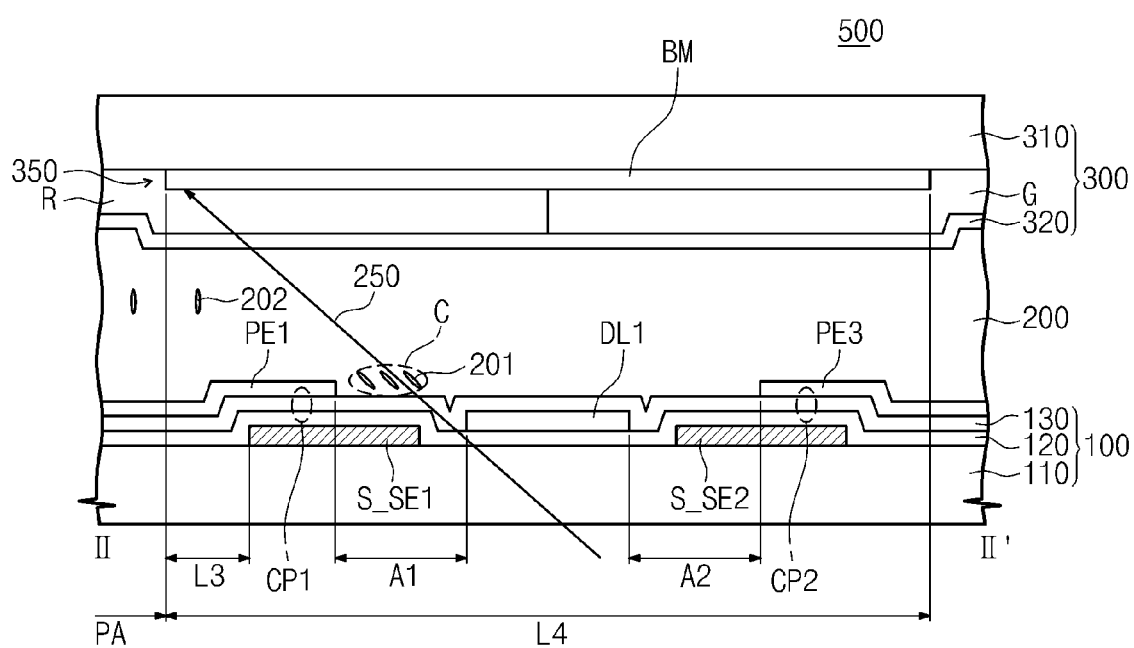
FIG. 2 is a cross-sectional view taken along line I-I' of FIG. 1.
Figure 3:
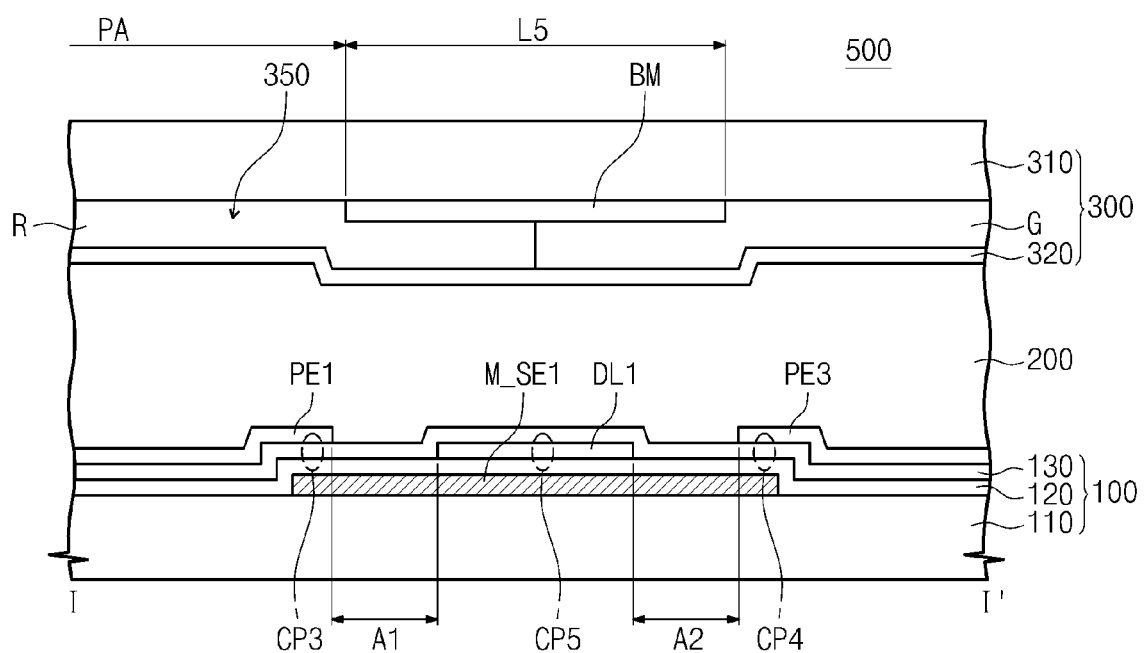
FIG. 3 is a cross-sectional view taken along line II-II' of FIG. 1.

However, even though the first main-storage electrode M_SE1 forms the parasitic capacitor with the first data line DL1, the first main-storage electrode M_SE1 is formed in a first area A1 positioned between the first data line DL1 and the first pixel electrode PE1 and also in a second area A2 positioned between the first data line DL1 and the third pixel electrode PE3, as shown in FIGS. 1 and 3. Thus, the first main-storage electrode M_SE1 may block a light, such as from a backlight, provided from a lower portion of the LCD 500 and advanced to the first area A1 and the second area A2. As a result, a size of a black matrix BM (shown in FIGS. 2 and 3) formed on the second substrate 300 to block the light may decrease, thereby improving an aperture ratio of the LCD 500. More detailed descriptions of the above will be further described with reference to FIG. 2.

Meanwhile, the first sub-storage electrode S_SE1 is spaced apart from the first data line DL1 while interposing the first area A1 therebetween in a plan view, and the first sub-storage electrode S_SE1 is overlapped by the first pixel electrode PE1. Also, the second sub-storage electrode S_SE2 is spaced apart from the first data line DL1 while interposing the second area A2 therebetween in a plan view, and the second sub-storage electrode S_SE2 is overlapped by the third pixel electrode PE3. Unlike the first main-storage electrode M_SE1, the first and second sub-storage electrodes S_SE1 and S_SE2 do not overlap with the first data line DL1.

As described above, the first and second sub-storage electrodes S_SE1 and S_SE2 are not entirely formed in the first and second areas A1 and A2. Thus, the first and second sub-storage electrodes S_SE1 and S_SE2 do not completely block the light, such as from a backlight, provided from the lower portion of the LCD 500 and advanced to the first and second areas A1 and A2, thereby causing the increase of size of the black matrix BM (shown in FIG. 2) that is formed on the second substrate 300 to block the light. Thus, the aperture ratio of the LCD 500 may be deteriorated.

However, the first and second sub-storage electrodes S_SE1 and S_SE2 do not overlap the first data line DL1. Therefore, the first and second sub-storage electrodes S_SE1 and S_SE2 and the first data line DL1 do not form the parasitic capacitors that may delay data signals transmitted through the first data line DL1.

Consequently, when assuming an effect that the aperture ratio of the LCD 500 increases by the first main-storage electrode M_SE1 is defined as a first effect, and an effect that the delay of the data signals transmitted through the first data line DL1 is prevented by the first and second sub-storage electrodes S_SE1 and S_SE2 is defined as a second effect, it is desirable to form the first main-storage electrode M_SE1 on the first substrate 100 rather than forming the first and second sub-storage electrodes S_SE1 and S_SE2 in order to improve the first effect of the LCD 500. In addition, in order to improve the second effect of the LCD 500, it is required to form the first and second sub-storage electrodes S_SE1 and S_SE2 on the first substrate 100 rather than forming the first main-storage electrode M_SE1.

The second effect may be improved as the first length L1 of each of the first and second sub-storage electrodes S_SE1 and SSE2 increases, and the first effect may be improved as the second length L2 of the first main-storage electrode M_SE1 increases. That is, the first effect and the second effect may be controlled by adjusting the first length L1 and the second length L2.

In general, when the size of the LCD 500 increases, the length of the data lines formed in the LCD 500 also increases, thereby causing an increase resistance of the data lines and a delay of the data signals that are transmitted through the data lines. Therefore, as the size of the LCD 500 increases, it is desirable to increase the first length L1 in the sum of the first and second lengths (L1+L2) of the first storage electrode SE1 in order to improve the second effect of the LCD 500.

For example, in a widescreen ultra extended graphics array ("WUXGA") LCD having 1920 by 1200 pixels, when the LCD 500 has 24 inches, a ratio of the first length L1 to the second length L2 is desirable to be within a range of about 3:7 to about 4:6, and when the LCD 500 has 26 inches, a ratio of the first length L1 to the second length L2 is desirable to be about 5:5. Additionally, a ratio of the first length L1 to the second length L2 can be with a range of about 5:5 to about 7:3 when the LCD 500 has a size greater than 26 inches.

FIG. 2 is a cross-sectional view taken along line I-I' of FIG. 1.

Referring to FIG. 2, the first sub-storage electrode S_SE1 and the second sub-storage electrode S_SE2 are formed on a first base substrate 110, and a gate insulating layer 120 is formed on the first base substrate 110 to cover the first and second sub-storage electrodes S_SE1 and S_SE2. The first data line DL1 is formed on the gate insulating layer 120 while not overlapped with the first and second sub-storage electrodes S_SE1 and S_SE2. The first data line DL1 and the first and second sub-storage electrodes S_SE1 and S_SE2 may extend substantially parallel to each other as shown in FIG. 1.

An inter-insulating layer 130 is formed on the first data line DL1, and the first pixel electrode PE1 and the third pixel electrode PE3 are formed on the inter-insulating layer 130 to overlap the first sub-storage electrode S_SE1 and the second sub-storage electrode S_SE2, respectively.

The black matrix BM is formed on a second base substrate 310 to block a light, and the black matrix BM has a fourth length L4. The black matrix BM is partially removed to form an opening 350 therethrough to transmit the light. Since the LCD 500 displays images using the light that transmits through the first substrate 100 and the second substrate 300, an area where the opening 350 is formed corresponds to the pixel area PA.

Meanwhile, a red filter R and a green filter G respectively facing the first pixel electrode PE1 and the third pixel electrode PE3 are formed on the black matrix BM and on the second base substrate 310. In FIG. 2, the red filter R and the green filter G have been illustrated, however, a blue filter (not shown) may be further formed on the second base substrate 310.

A common electrode 320 is formed on the red color filter R and the green color filter G. The common electrode 320 is arranged to face the first pixel electrode PE1 and the third pixel electrode PE3, and the common electrode 320 forms an electric field with the first and third pixel electrodes PE1 and PE3 to control an alignment state of liquid crystal molecules in the liquid crystal layer 200.

The first pixel electrode PE1 overlaps the first sub-storage electrode S_SE1 to form a first capacitor CP1, and the third pixel electrode PE3 overlaps the second sub-storage electrode S_SE2 to form a second capacitor CP2. The first and second capacitors CP1 and CP2 serve as storage capacitors compensating electric charges that are discharged from a liquid crystal capacitor formed by each of the first and third pixel electrodes PE1 and PE3 and the common electrode 320.

The first capacitor CP1 has a capacitance that is proportional to an overlap area of the first sub-storage electrode S_SE1 and the first pixel electrode PE1, and the second capacitor CP2 has a capacitance that is proportional to an overlap area of the second sub-storage electrode S_SE2 and the third pixel electrode PE3.

As shown in FIG. 1, as the first length L1 of each of the first sub-storage electrode S_SE1 and the second sub-storage electrode and S_SE2 increases, the capacitances of the first capacitor CP1 and the second capacitor CP2 correspondingly increase.

The first and second sub-storage electrodes S_SE1 and S_SE2 are spaced apart from the first data line DL1 in a plan view as shown in FIG. 1. Thus, the capacitances of the parasitic capacitors that are formed by each of the first and second sub-storage electrodes S_SE1 and S_SE2 and the first data line DL1 may be minimized. As a result, the delay of the data signals transmitted through the first data line DL1 may be prevented from being delayed, caused by the parasitic capacitors.

Meanwhile, an electric potential difference occurs between the first pixel electrode PE1 and the first sub-storage electrode S_SE1 due to the first capacitor CP1. As a result, a fringe field may be generated in an area C which is adjacent to an end portion of the first pixel electrode PE1. The area C may be located in an area adjacent to the first pixel electrode PE1 and over the first sub-storage electrode S_SE1, where the first sub-storage electrode S_SE1 is not overlapped by the first pixel electrode PE1. When the fringe field is formed in the area C, first liquid crystal molecules 201 that are positioned in the area C are aligned to be more inclined toward the first base substrate 110 by the fringe field than second liquid crystal molecules 202 that are positioned corresponding to a center portion of the first pixel electrode PE1. Therefore, a light 250 that transmits through the first area A1 and proceeds to the area C is not blocked by the first liquid crystal molecules 201, and the light 250 may transmit through the second substrate 300 and exit from the substrate 300 to the outside, to thereby cause a light leakage. However, the black matrix BM formed on the second base substrate 310 may block the light from exiting the second substrate 300 to the outside, so that the light leakage may be prevented.

FIG. 3 is a cross-sectional view taken along line II-II' of FIG. 1.

Referring to FIG. 3, the first main-storage electrode M_SE1 is arranged on the first base substrate 110, and the gate insulating layer 120 is formed on the first base substrate 100 and the first main-storage electrode M_SE1. The first data line DL1 that overlaps the first main-storage electrode M_SE1 is arranged on the gate insulating layer 120. The first main-storage electrode M_SE1 is wider than the first data line DL1.

The inter-insulating layer 130 is arranged on the first data line DL1 and the gate insulating layer 120, and the first pixel electrode PE1 and the third pixel electrode PE3 are formed on the inter-insulating layer 130 while overlapping side portions of the first main-storage electrode M_SE1.

The first pixel electrode PE1 overlaps the first main-storage electrode M_SE1 to form a third capacitor CP3, and the third pixel electrode PE3 overlaps the first main-storage electrode M_SE1 to form a fourth capacitor CP4. The third and fourth capacitors CP3 and CP4 serve as storage capacitors compensating electric charges that are discharged from a liquid crystal capacitor formed by each of the first and third pixel electrodes PE1 and PE3 and the common electrode 320.

The third capacitor CP3 has a capacitance that is proportional to an overlap area of the first main-storage electrode M_SE1 and the first pixel electrode PE1, and the fourth capacitor CP4 has a capacitance that is proportional to an overlap area of the first main-storage electrode M_SE1 and the third pixel electrode PE3.

Referring to FIG. 1, as the second length L2 of the first main-storage electrode M_SE1 increases, the capacitances of the third capacitor CP3 and the fourth capacitor CP4 correspondingly increase.

Since the first main-storage electrode M_SE1 overlaps with the first data line DL1, the first main-storage electrode M_SE1 may form a fifth capacitor CP5 with the first data line DL1. The fifth capacitor CP5 may serve as a parasitic capacitor that delays data signals transmitted through the first data line DL1.

However, since the first main-storage electrode M_SE1 is formed in the first area A1 and the second area A2, thus covering first and second areas A1 and A2 from the first and third pixel electrodes PE1 and PE3 to the first data line DL1 in the first direction D1, unlike the first and second sub-storage electrodes S_SE1 and S_SE2 (shown in FIG. 2), the first main-storage electrode M_SE1 completely blocks a light, such as from a backlight, that is provided from the lower portion of the LCD 500 and advanced to the first and second areas A1 and A2. Accordingly, the size of the black matrix BM formed corresponding to the first main-storage electrode M_SE1 may be reduced.

More particularly, the width of the black matrix BM (shown in FIG. 2) formed corresponding to the first and second sub-storage electrodes S_SE1 and S_SE2 (shown in FIG. 2) has the fourth length L4 (shown in FIG. 2), and a width of the black matrix BM formed corresponding to the first main-storage electrode M_SE1 has a fifth length L5 (FIG. 3) that is smaller than the fourth length L4. Thus, since the width of the black matrix BM may be reduced more when the first main-storage electrode M_SE1 is formed on the first base substrate 110 than when the first and second sub-storage electrodes S_SE1 and S_SE2 are formed on the first base substrate 110, the aperture ratio of the LCD 500 is improved.

Figure 4:
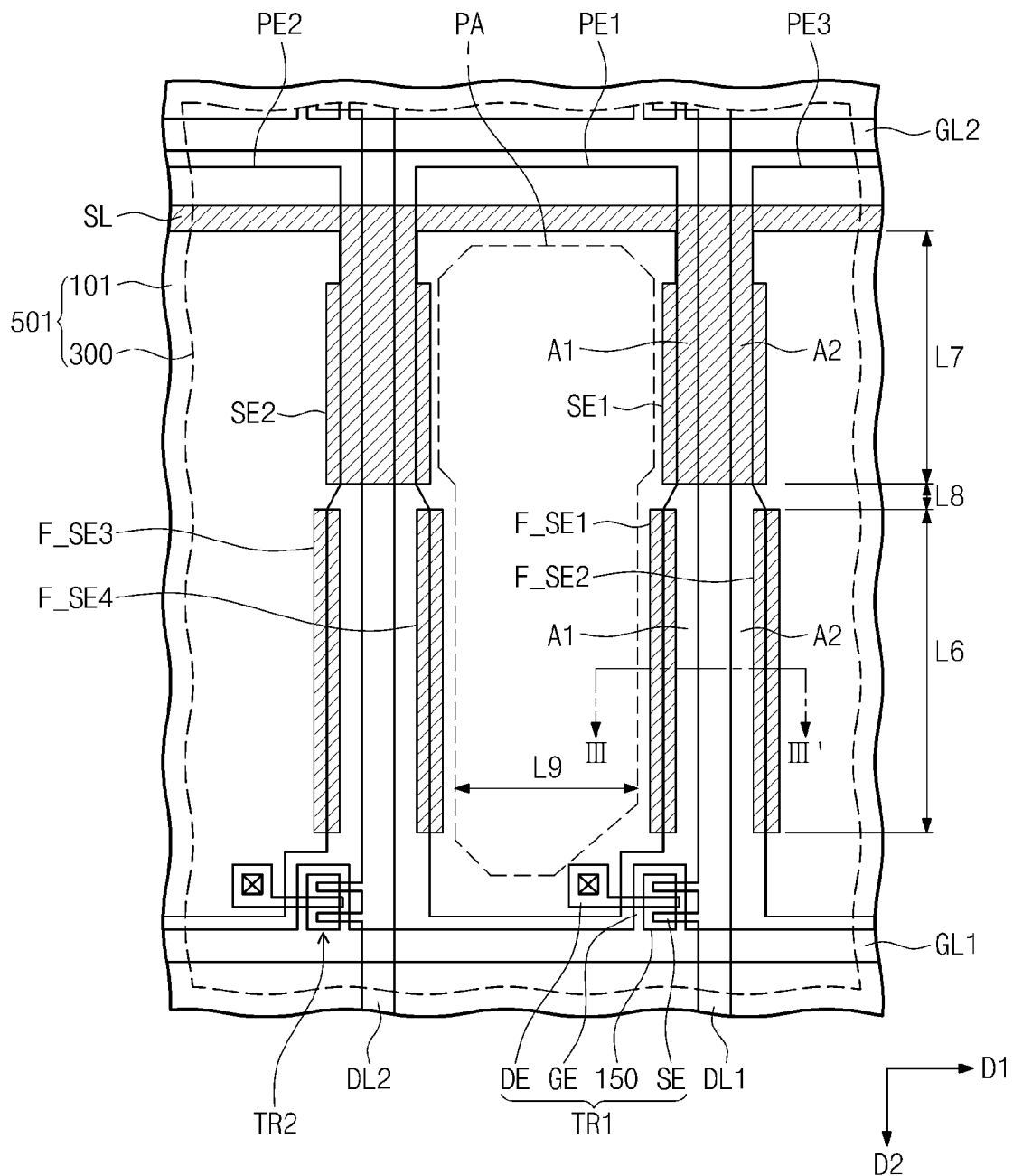
FIG. 4 is a sectional view showing another exemplary embodiment of an LCD according to the present invention.

FIG. 4 is a sectional view showing another exemplary embodiment of an LCD according to the present invention. In FIG. 4, the same reference numerals denote the same elements in FIG. 1, and thus the detailed descriptions of the same elements will be omitted.

Referring to FIG. 4, a first substrate 101 includes a storage line SL, a first storage electrode SE1, a second storage electrode SE2, a first floating-storage electrode F_SE1, a second floating-storage electrode F_SE2, a third floating-storage electrode F_SE3, and a fourth floating-storage electrode F_SE4.

The storage line SL extends in a first direction D1, and the first and second storage electrodes SE1 and SE2 each branched from the storage line SL extend in a second direction D2. The first and second storage electrodes SE1 and SE2 overlap the first and second data lines DL1 and DL2, respectively. Also, each of the first and second floating-storage electrodes F_SE1 and F_SE2 is adjacent to an end portion of the first storage electrode SE1 but spaced apart from the first storage electrode SE1 by an eighth length L8. The eighth length L8 is within a range from about 5 micrometers to about 10 micrometers, and more particularly, the eighth length L8 is within a range from about 7 micrometers to about 8 micrometers. The first and second floating-storage electrodes F_SE1 and F_SE2 also extend in the second direction D2 and are spaced apart from each other and from the first data line DL1, with the first data line DL1 extending between the first and second floating-storage electrodes F_SE1 and F_SE2.

Each of the third and fourth floating-storage electrodes F_SE3 and F_SE4 is adjacent to an end portion of the second storage electrode SE2 but spaced apart from the second storage electrode SE2 by the eighth length L8. The third and fourth floating-storage electrodes F_SE3 and F_SE4 also extend in the second direction D2 and are spaced apart from each other and from the second data line DL2, with the second data line DL2 extending between the third and fourth floating-storage electrodes F_SE3 and F_SE4.

Figure 5:
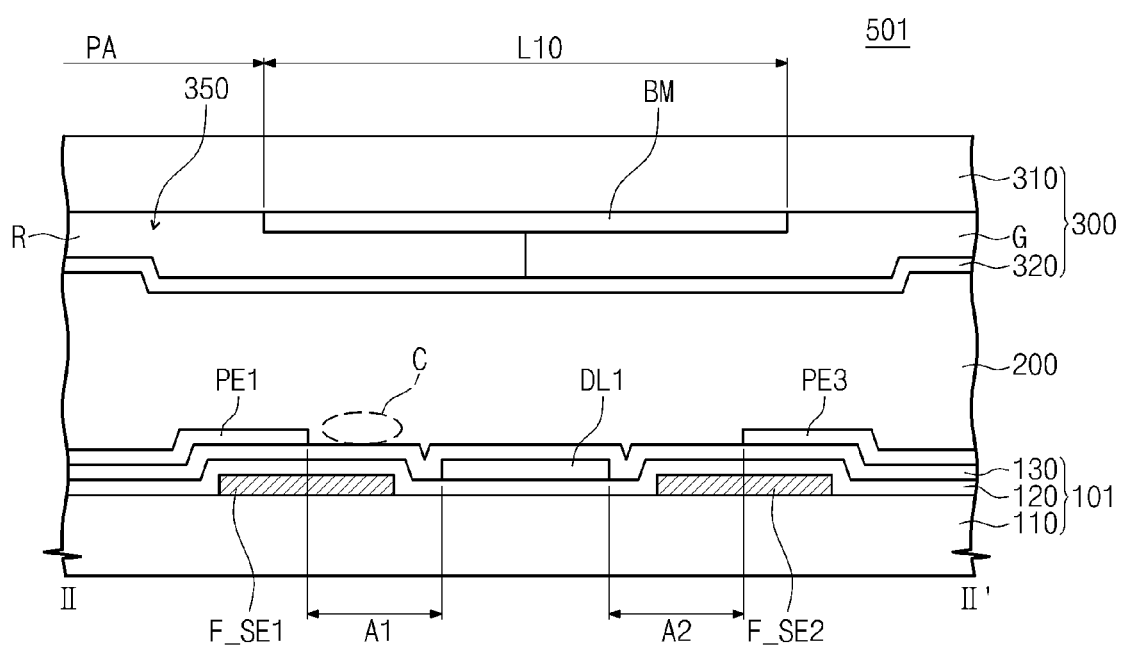
FIG. 5 is a cross-sectional view taken along line III-III' of FIG. 4.

FIG. 5 is a cross-sectional view taken along line III-III' of FIG. 4.

Referring to FIG. 5, the first floating-storage electrode F_SE1 and the second floating-storage electrode F_SE2 are arranged on the first base substrate 110, and a gate insulating layer 120 is arranged on the first base substrate 110 and the first and second floating-storage electrodes F_SE1 and F_SE2. Also, a first data line DL1 is arranged on the gate insulating layer 120 such that the first data line DL1 does not overlap the first and second floating-storage electrodes F_SE1 and F_SE2. The first data line DL1 is located between the first and second floating-storage electrodes F_SE1 and F_SE2, and is arranged parallel to the first and second floating-storage electrodes F_SE1 and F_SE2 and spaced from the first and second floating-storage electrodes F_SE1 and F_SE2.

Since the first and second floating-storage electrodes F_SE1 and F_SE2 are spaced apart from the first storage electrode SE1 (shown in FIG. 4), a common voltage that is provided to the storage line SL (shown FIG. 4) is not applied to the first and second floating-storage electrodes F_SE1 and F_SE2 through the first storage electrode SE1. Thus, when a pixel voltage is applied to the first pixel electrode PE1, the electric potential of the first floating-storage electrode F_SE1 becomes equipotential with the first pixel electrode PE1, and the difference in electric potential rarely occurs between the first floating-storage electrode F_SE1 and the first pixel electrode PE1.

Since the difference in electric potential rarely occurs between the first floating-storage electrode F_SE1 and the first pixel electrode PE1 when the pixel voltage is applied to the first pixel electrode PE1, a fringe field is not formed in an area C which is positioned between an end portion of the first pixel electrode PE1 and the first floating-storage electrode F_SE1, where the area C is positioned over the first floating-storage electrode F_SE1 and between the end portion of the first pixel electrode PE1 and the first data line DL1, within the area A1. As a result, the width of the black matrix BM that is formed in a place, such as on the second base substrate 310 of the second substrate 300, facing the first and second floating-storage electrodes F_SE1 and F_SE2 in order to prevent the light leakage phenomenon described in FIG. 2 may decrease, thereby improving the aperture ratio of the LCD 501.

Referring to FIGS. 2 and 5, the width of the black matrix BM shown in FIG. 2 and the width of the black matrix BM shown in FIG. 5 are different from each other. That is, the width of the black matrix BM in FIG. 2 formed in a place, such as on the second base substrate 310 of the second substrate 300, that faces the first and second sub-storage electrodes S_SE1 and S_SE2 has the fourth length L4, and the width of the black matrix BM in FIG. 5 formed in a place, such as on the second base substrate 310 of the second substrate 300, that faces the first and second floating-storage electrodes F_SE1 and F_SE2 has a tenth length L10 that is smaller than the fourth length L4.

In other words, the width of the opening 350 formed through the black matrix BM in FIG. 2 facing the first and second sub-storage electrodes S_SE1 and S_SE2 is smaller than the size of the opening 350 formed through the black matrix BM in FIG. 5 facing the first and second floating-storage electrodes F_SE1 and F_SE2. Therefore, the aperture ratio of the LCD 501 may be improved more when the first and second floating-storage electrodes F_SE1 and F_SE2 are on the first base substrate 110 than when the first and second sub-storage electrodes S_SE1 and S_SE2 are on the first base substrate 110. Thus, a lower portion of the pixel area PA in FIG. 1 has the third length L3 (shown in FIG. 1), and a lower portion of the pixel area PA in FIG. 4 has a ninth length L9 that is larger than the third length L3. The third length L3 and the ninth length L9 of the pixel areas PA are measured in the first direction D1.

In the present exemplary embodiment, a capacitance of a storage capacitor formed by the first floating-storage electrode F_SE1 and the first pixel electrode PE1 may be extremely low, and also a capacitance of a storage capacitor formed by the second floating-storage electrode F_SE2 and the third pixel electrode PE3 may be extremely low. However, the capacitance of the storage capacitor may be supplemented by increasing the seventh length L7 that is equal to the length of the first storage electrode SE1 (shown in FIG. 4).

Accordingly, the capacitance of the storage capacitor used to drive the liquid crystal layer 200 may be obtained when the first storage electrode SE1 (shown in FIG. 4) is formed on the first base substrate 110 with a desired length, and the aperture ratio of the LCD 501 may be improved by forming the first and second floating-storage electrodes F_SE1 and F_SE2.

In addition, since the first and second floating-storage electrodes F_SE1 and F_SE2 do not overlap the first data line DL1, the capacitance of the parasitic capacitor formed by each of the first and second floating storage-electrodes F_SE1 and F_SE2 with the first data line DL1 is minimized. As a result, the data signals transmitted through the first data line DL1 may be prevented from being delayed by the first and second floating storage-electrodes F_SE1 and F_SE2.

According to the above, the capacitance of the storage capacitor and the aperture ratio of the display apparatus may be adjusted according to the structure of the storage electrode of the display apparatus. Also, the capacitance of the parasitic capacitor that causes the delay of electric signals transmitted through the wires may decrease according to the structure of the storage electrode, thereby improving the driving capability of the display apparatus.

Although exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display apparatus comprising:
a first substrate;
a second substrate facing the first substrate;
a gate line arranged on the first substrate;
a data line arranged on the first substrate, the data line crossing the gate line;
a storage line arranged on the first substrate and spaced apart from the gate line;
a pixel electrode arranged in a pixel area;
a common electrode arranged on the second substrate to face the pixel electrode;
a main-storage electrode extending in a same direction as the data line and branched from the storage line to overlap with the pixel electrode and the data line; and
sub-storage electrodes branched from the main storage electrode, a sub-storage electrode of the sub-storage electrodes overlapped with the pixel electrode,
wherein the sub-storage electrodes extend in a direction substantially parallel to the data line.

2. The display apparatus of claim 1, wherein the gate line and the storage line extend in a first direction, and the data line, the main-storage electrode, and the sub-storage electrodes extend in a second direction substantially perpendicular to the first direction.

3. The display apparatus of claim 2, wherein the sub-storage electrodes comprise:

a first sub-storage electrode; and
a second sub-storage electrode spaced apart from the first sub-storage electrode while interposing the data line between the first sub-storage electrode and the second sub-storage electrode in a plan view.

4. The display apparatus of claim 2, wherein the main-storage electrode and the data line form a first capacitor having a first capacitance, the main-storage electrode and the pixel electrode form a second capacitor having a second capacitance, the sub-storage electrode and the pixel electrode form a third capacitor having a third capacitance, the first capacitance and the second capacitance are varied according to a first length of the main-storage electrode extending in the second direction, and the third capacitance is varied according to a second length of the sub-storage electrode extending in the second direction.

5. The display apparatus of claim 4, wherein a ratio of the first length to the second length is 3:7 to 7:3.

6. The display apparatus of claim 5, further comprising:
a liquid crystal interposed between the first substrate and the second substrate; and
a light blocking layer arranged on the second substrate and provided with an opening formed therethrough corresponding to the pixel area.

7. The display apparatus of claim 2, further comprising:
a liquid crystal disposed between the first substrate and the second substrate; and
a light blocking layer arranged on the second substrate and provided with an opening formed therethrough corresponding to the pixel area.

8. The display apparatus of claim 1, wherein the main-storage electrode and the data line form a first capacitor having a first capacitance, the main-storage electrode and the pixel electrode form a second capacitor having a second capacitance, the sub-storage electrode and the pixel electrode form a third capacitor having a third capacitance, the first capacitance and the second capacitance are varied according to a first length of the main-storage electrode extending in a second direction, and the third capacitance is varied according to a second length of the sub-storage electrode extending in the second direction.

9. The display apparatus of claim 8, wherein a ratio of the first length to the second length is 3:7 to 7:3.

10. The display apparatus of claim 8, further comprising:
a liquid crystal disposed between the first substrate and the second substrate; and
a light blocking layer arranged on the second substrate provided with an opening formed therethrough corresponding to the pixel area.

11. The display apparatus of claim 1, further comprising:
a liquid crystal disposed between the first substrate and the second substrate; and
a light blocking layer arranged on the second substrate and provided with an opening formed therethrough corresponding to the pixel area.

12. A display apparatus comprising:
a first substrate;
a second substrate facing the first substrate;
a gate line arranged on the first substrate;
a data line arranged on the first substrate and crossing the gate line;
a light blocking layer arranged on the first substrate and provided with an opening formed therethrough corresponding to a pixel area;
a storage line arranged on the first substrate and spaced apart from the gate line;
a pixel electrode arranged in the pixel area;

a common electrode arranged on the second substrate to face the pixel electrode;

a storage electrode extended in a same direction as the data line and branched from the storage line to overlap with the pixel electrode and the data line; and a plurality of floating-storage electrodes spaced apart from the storage electrode, a floating-storage electrode of the plurality of floating-storage electrodes overlapped with the pixel electrode.

13. The display apparatus of claim 12, wherein the gate line and the storage line extend in a first direction, and the data line, the storage electrode, and the floating-storage electrodes extend in a second direction substantially perpendicular to the first direction.

14. The display apparatus of claim 13, wherein the floating-storage electrodes comprise:

a first floating-storage electrode; and a second floating-storage electrode spaced apart from the first floating-storage electrode while interposing the data line between the first floating-storage electrode and the second floating-storage electrode in a plan view.

15. The display apparatus of claim 13, wherein the storage electrode and the data line form a first capacitor having a first capacitance, the storage electrode and the pixel electrode form a second capacitor having a second capacitance, and the first capacitance and the second capacitance are varied according to a first length of the storage electrode extending in the second direction.

16. The display apparatus of claim 15, wherein the floating-storage electrodes are spaced apart from an end portion of the storage electrode by about 5 micrometers to about 10 micrometers.

17. The display apparatus of claim 16, further comprising a liquid crystal interposed between the first substrate and the second substrate.

18. The display apparatus of claim 12, wherein the storage electrode and the data line form a first capacitor having a first capacitance, the storage electrode and the pixel electrode form a second capacitor having a second capacitance, and the first capacitance and the second capacitance are varied according to a first length of the storage electrode extending in a second direction.

19. The display apparatus of claim 18, wherein the floating-storage electrodes are spaced apart from an end portion of the storage electrode by about 5 micrometers to about 10 micrometers.

20. The display apparatus of claim 12, wherein the floating-storage electrodes are spaced apart from an end portion of the storage electrode by about 5 micrometers to about 10 micrometers.

21. A method of improving a display quality and a driving capability of a display apparatus, the method comprising:

arranging a storage line on a first substrate, the storage line extending in a first direction;

depending a main storage electrode from the storage line to overlap with a pixel electrode and a data line, the main storage electrode extending in a second direction crossing the first direction, the main storage electrode having a first length;

providing first and second sub-storage electrodes adjacent to an end of the main storage electrode and extending in the second direction, one of the first and second sub-storage electrodes to overlap with the pixel electrode, the first and second sub-storage electrodes arranged on opposite sides of the data line and spaced from the data line to minimize parasitic capacitance, the first and second sub-storage electrodes having a second length extending substantially parallel to the data line;

wherein the display quality of the display apparatus is improved by controlling the first length of the main storage electrode to maximize an aperture ratio of the display apparatus, and the driving capability of the display apparatus is improved by controlling the second length of the first and second sub-storage electrodes to reduce delay of data signals transmitted through the data line.

22. The method of claim 21, wherein providing the first and second sub-storage electrodes adjacent to an end of the main storage electrode includes branching the first and second sub-storage electrodes from the main storage electrode.

23. The method of claim 21, wherein providing the first and second sub-storage electrodes adjacent to an end of the main storage electrode includes separating the first and second sub-storage electrodes from the main storage electrode to form first and second floating sub-storage electrodes.

* * * * *